UNITED STATES PATENT OFFICE.

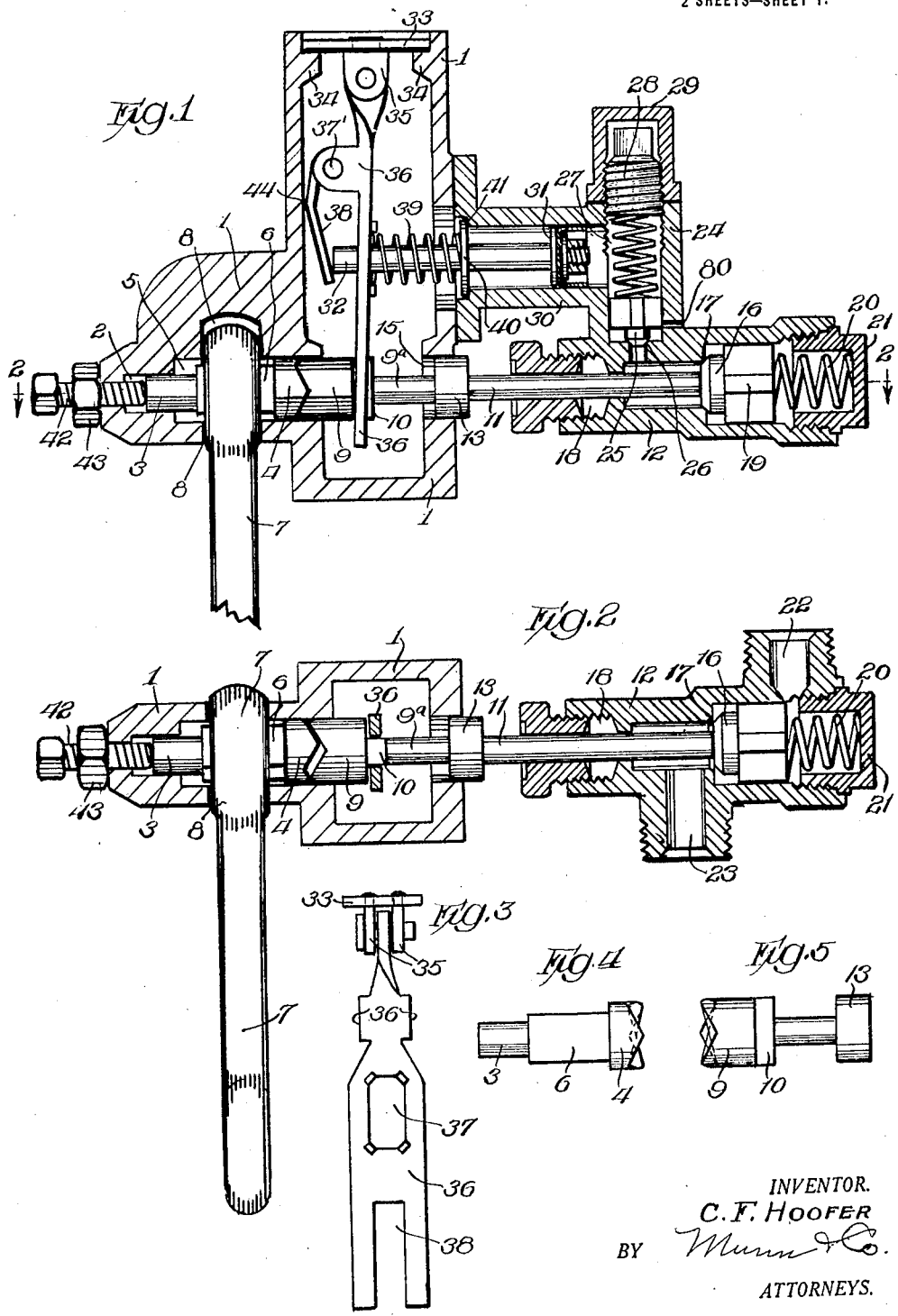

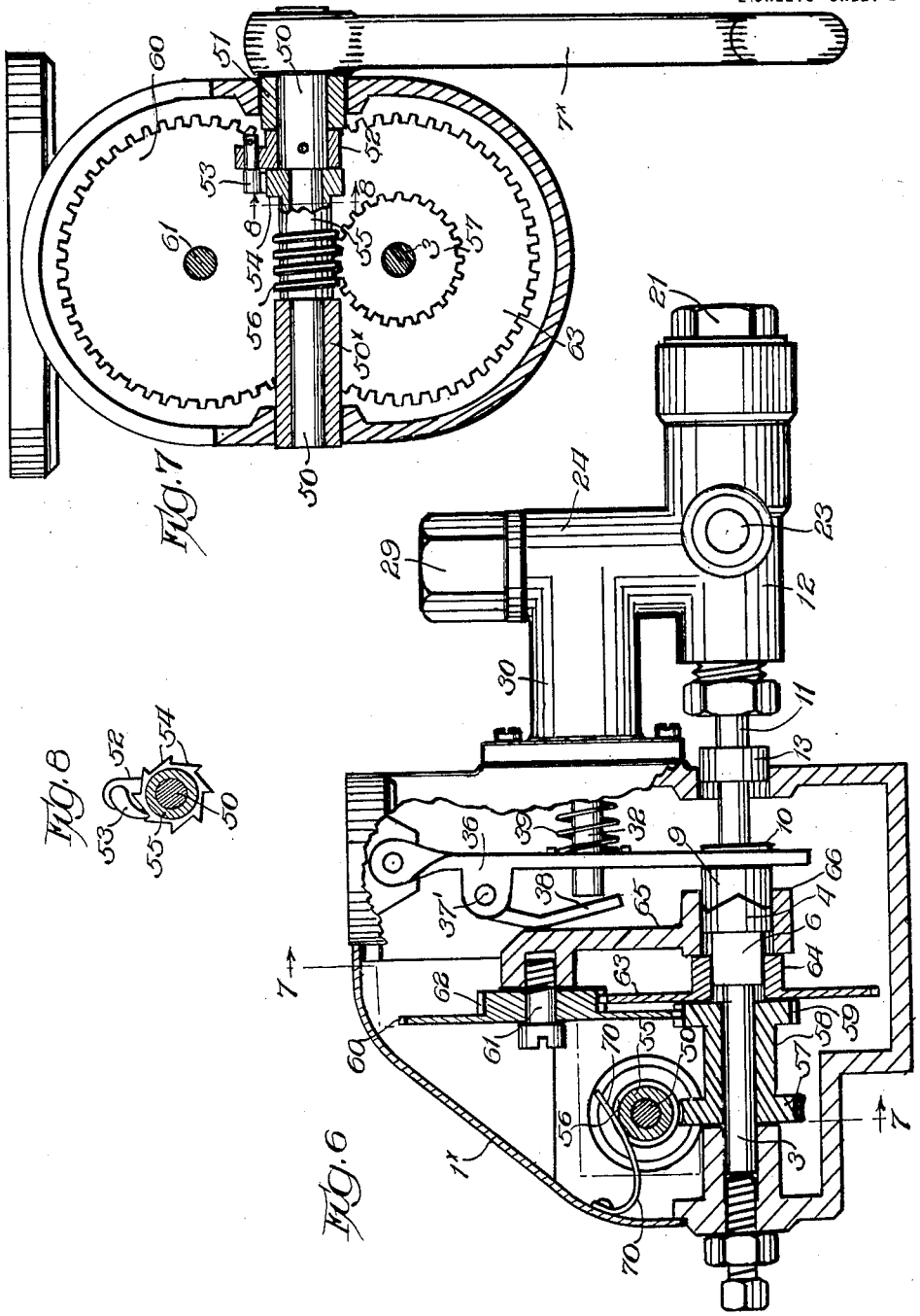

CHARLES F. HOOFER, OF CHICAGO, ILLINOIS.

PNEUMATIC CONTROL FOR LUBRICATORS.

1,401,473.  Specification of Letters Patent.  Patented Dec. 27, 1921.

Application filed January 2, 1920. Serial No. 348,848.

*To all whom it may concern:*

Be it known that I, CHARLES F. HOOFER, a citizen of the United States, and a resident of the city of Chicago, in the county of Cook and State of Illinois, have invented a new and useful Improvement in Pneumatic Control for Lubricators, of which the following is a full, clear, and exact description.

My invention relates to improvements in devices for controlling air for actuating lubricators of the type set forth in my prior Patent No. 1278657 of September 10, 1918.

An object of my invention is to provide an automatic air control device which will operate when the control lever is moved, as, for instance, by the swinging of a truck when a train goes around a bend, as disclosed in my prior patent aforesaid, and which will shut off the flow of air to the lubricator when the pressure has reached a predetermined maximum.

A further object of my invention is to provide a simple device of the type described, in which the air controlling device is automatically brought to its normal position ready to turn on the air whenever an actuating lever is moved.

A further object of my invention is to provide a device in which the turning on of the air is accomplished by the movement of a lever from a normally neutral position in either direction, so that in case the lever operating means is a truck, it is immaterial in which direction the track moves, the air device will be actuated through such movement.

A further object of my invention is to provide an air control device in which a maximum pressure of the air admitted by the air valve causes the closing of the air valve to avoid a waste of air.

A further object of my invention is to provide means by which the degree of maximum pressure may be regulated as occasion demands.

Other objects and advantages will appear in the following specification, and the novel features of the invention will be particularly pointed out in the appended claims.

My invention is illustrated in the accompanying drawings, forming part of this invention, in which—

Figure 1 is a central longitudinal section through the device,

Fig. 2 is a section along the line 2—2 of Fig. 1,

Fig. 3 is a detail face view of a lever used in connection with the air control, Figs. 4 and 5 are detail views of the cam members for operating the air valve, Fig. 6 is a view partly in section of a modified form of the device, Fig. 7 is a sectional view along the line 7—7 of Fig. 6, and Fig. 8 is a section along the line 8—8 of Fig. 7.

In carrying out my invention, I provide a casing 1 of the shape shown in the drawings which is made preferably of a metal of any suitable sort. The casing is provided with an internal reduced bore 2 arranged to receive the reduced portion 3 of a cam member 4, which is designed to rotate in a bore 5. The cam member has a shank 6 of square or other non-circular cross section which is designed to pass through a similarly shaped opening in the end of a lever 7, which extends through an opening 8 in the casing 1, and which is designed to be oscillated in the manner hereinafter described. Arranged to coöperate with the cam member 4 is a cam member 9 (see Fig. 5) which is provided with a rectangular lug 10 on its rear side, and has a reduced portion $9^a$ provided with an integral bearing member 13 which is arranged to slide in a cylindrical opening 15 in the casing 1.

A valve 16 is carried by the casing 12, adjacent to a floating valve stem 11, and is arranged to seat at 17 when the parts are in the position shown in Fig. 1. The valve stem passes through a packing gland 18. The valve 16 is provided with integral guide wings 19 arranged substantially at right angles to each other, as shown in the drawing. A spiral spring 20 bears at one end on a screw cap 21, which is screwed into the end of the valve casing, as shown. The valve casing 12 has an inlet 22 into the interior on one side of the valve 16, and is provided with an outlet 23 on the opposite side. On the side of the outlet is an integral cylindrical extension 24, in which is disposed an auxiliary valve 25 which is seated at 26. This valve is similar in construction to the valve 16 and is provided with a spring 27 for normally holding the valve to its seat. A screw plug 28 is provided for regulating the tension of the spring 27, and this screw plug is covered by a screw cap 29.

The cylindrical extension 24 has a laterally extending cylindrical portion 30, in which is disposed a piston or plunger 31. The stem 32 of this plunger extends into the interior of the casing 1. A plate 33 rests upon shoulders 34 on the casing 1 and is provided with ears 35, to which is pivotally attached a lever 36. The latter is provided with an opening 37 (see Fig. 3), and with a slot 38 extending inwardly from one end. The lever 36 has pivotally attached at 37' an auxiliary lever 38, against which the stem 32 of the piston 31 normally bears. A spring 39 surrounds the stem 33 and bears at one end on a washer 40, through which the stem 32 passes, and at the other end on the lever 36. The washer 40 normally rests on a seat 41 in the cylindrical portion 30.

From the foregoing description of the various parts of the device, the operation thereof may be readily understood. Fig. 1 represents a vertical section, and the lever 7 is in a perpendicular position. The end of the reduced portion 3 is kept in position by means of a set screw 42 and a lock nut 43. It will be observed that in the position shown in Fig. 1, the valve 16 is seated, and, therefore, the air coming through the inlet 22 is prevented from going to the outlet 23. When the lever 7 is moved from its position, shown in Fig. 1, by any suitable means, as, for instance, by the rod connected with the truck, disclosed in my prior patent aforesaid, as when the car is going around a bend in the track, the cam member 4 will be rotated. The cam member 9 will be prevented from rotating, since the lever 36 is straddling the lug 10. The inclined cam surfaces of the members 4 and 9 will, therefore, cause a movement of the cam member 9 and of the valve stem 11 toward the right, as shown in Fig. 2, thus opening the valve 16 and permitting a flow of air through the inlet 22, past the valve 16, and out of the outlet 23 to the lubricator (not shown), for causing the oil to be supplied to the wheel flange, as set forth in the prior patent.

The air entering the valve casing 12 forces open the valve 25 against the tension of the spring 27, when the air reaches a predetermined pressure. It pushes the piston or plunger 31 to the left in Fig. 1, and the stem 32 which is connected to the plunger bears on the lever 38, so as to force the pivotal connection of the lever 38 with the lever 36 toward the right, the lever 38 being fulcrumed at its bend 44. The movement of the lever 36 to the right will bring its lower end off from the lug 10. The cam member 9 is now free to revolve, and under the action of the spring 20, it will be forced into normal engagement with the cam member 4, as shown in Fig. 1. The valve 16 will be closed, although the car may be still on the bend of the track. Now when a straight portion of the track is reached, and the truck swings in the opposite direction, the lever 7 will be rotated in the reverse direction. As soon as the lug 10 gets into alinement with the slot 38 on the lever 36, the latter will straddle the lug to prevent the turning of the cam member 9, until air has been again admitted, and the lever 36 moved in the manner described to release the cam member.

It will thus be seen that I have provided a device in which the air is admitted to the pipe 23, connected with the lubricator (not shown), at any time when there is a movement of the lever 7 out of its normal position, but that the retention of the lever 7 out of normal position will not permit a waste of air, because the air will be shut off automatically when it reaches a predetermined pressure. Each time, however, that the car reaches a bend in the track, the device acts to turn on air to the lubricator, being brought back to normal between the movements of the lever 7 from the perpendicular, in the manner described.

In the modified form of the device, shown in Figs. 6, 7, and 8, I have provided a casing 1˟ in which is mounted for oscillation a lever 7˟, this lever being designed to be periodically oscillated or reciprocated by any suitable connection from a moving part of the engine, as, for instance, from a valve rod. The lever is mounted on a shaft 50 which is journaled at 51, and to which is secured a collar 52 bearing a pawl 53, arranged to engage a ratchet 54, formed on a sleeve 55 which surrounds a reduced portion of the shaft 50, and which bears a worm 56. A bushing 50˟ surrounds the opposite end of the shaft 50. The latter is in mesh with a worm wheel 57 on a sleeve 58, bearing a gear 59 in mesh with a gear 60, mounted on a stub axle 61. The gear 60 has an integral gear 62 which engages a gear 63. The latter gear has a socket 64, into which the squared portion 6 of the cam member 4 is arranged to enter. The casing is provided with a bracket 65 which bears the stub axle 61, and which has a sleeve 66 provided with a cylindrical bore arranged to receive the cam members 4 and 9. The remaining construction is similar to that already described in connection with Fig. 1.

In the operation of this form of the apparatus, the lever 7˟ is reciprocated, as stated, periodically, and at each reciprocation, the pawl 53 engages a ratchet 54 to turn the latter one tooth, thus turning the worm 56, and through the medium of the engaged gears 57, 59, 60, 62 and 63, the cam member 4 is turned, thus forcing the cam member 9 to the right in Fig. 6, and opening the valve. When the air pressure reaches a predetermined maximum, the lever 36 is disconnected from the cam member 9 in the manner already described, when the air pressure will be shut off. As the cam member 4 continues to revolve, it will turn with it the cam member 9, until the lever again straddles the lug 10, when the cam member 9 will be kept from turning, and, as the cam member 4 is turned, it will again be forced to the right to open the valve. This action continues in regular occurrence as long as the lever 7× is reciprocated, thus admitting air through the outlet 23 to the lubricator to cause the lubrication of the parts desired to receive lubrication.

In order to prevent the movement of the worm 56 on the rearward movement of the lever 7×, I make use of a spring brake 70 which will permit the forward movement of the worm as it is positively driven by the ratchet, but which will prevent the rearward movement of the worm when the shaft 50 is turned in the opposite direction.

It will be noted that I have provided an air outlet 80 in the cylinder 24. This outlet is relatively small, but it permits the air to escape so as to bring the apparatus back into the normal position, shown in Fig. 1, ready for action again when the lever 7 is moved from its normal position.

While I have described an air control device, it will be understood that this device might be equally as well used in connection with steam or a similar motive fluid, without departing from the spirit and the scope of the invention.

It is obvious that by turning the screw plug 28, the tension of the spring 27 may be adjusted so that the valve 25 may be opened at any predetermined pressure desired. Furthermore, by turning the screw plug so as to force the spring downwardly, the valve may be held to its seat permanently. In winter especially, it is very desirable to give a longer period of lubrication, and the automatic release may be put out of commission by holding the valve 25 on its seat, and thus restricting the operation of the valve 16 to the agency of the lever 7 and the cam members 4 and 9, as heretofore described.

I claim:

1. In a controlling device for lubricators, a valve for controlling the flow of motive fluid, means for opening the valve to permit a flow of the fluid, means actuated through the pressure of the released fluid for closing the valve and means adapted to lock said valve-closing means in inoperative position.

2. In a controlling device for lubricators, a valve for controlling the flow of motive fluid, means, including a pair of co-acting cam members, for opening said valve, means actuated by a predetermined pressure of the released fluid for moving one of said cam members relatively to the other, whereby the valve is closed and means adapted to lock said valve-closing means in inoperative position.

3. In a controlling device for lubricators, a valve for controlling the flow of motive fluid, means for opening the valve, means controlled by a predetermined pressure of the released fluid for effecting the subsequent closure of the valve and means adapted to lock said valve-closing means in inoperative position.

4. In a pneumatic control for lubricators, a valve casing having an inlet and an outlet, a valve disposed in said casing between said inlet and outlet, a lever, means between said lever and said valve for opening the valve when the lever is shifted, means controlled by the pressure of the released fluid and acting independently of the lever for subsequently closing the valve and means adapted to lock said valve-closing means in inoperative position.

5. In a pneumatic control for lubricators, a valve casing having an inlet and an outlet, a valve carried by the casing between said inlet and outlet, an actuating lever, connections between said lever and said valve for opening the latter when the lever is moved, pneumatic means actuated at a predetermined pressure of the released fluid for closing the valve independently of the movement of the lever and means adapted to lock said valve-closing means in inoperative position.

6. In a pneumatic control for lubricators, a valve casing having an inlet and an outlet, a valve carried by the casing between said inlet and outlet, an actuating lever, connections between said lever and said valve for actuating the valve when the lever is moved, said connections including a pair of cam members, and pneumatic means acting at a predetermined pressure of the motive fluid for moving one of said cam members relatively to the other, whereby said valve is closed.

7. In a pneumatic control for lubricators, a valve casing having an inlet and an outlet, a valve disposed between said inlet and said outlet, a lever having a cam member fixed thereto, said cam member being mounted for rotation, a second cam member in engagement with said first named cam member, said second named cam member being rotatable and slidable with respect to said first named cam member, means connecting said second named cam member with said valve for opening the latter, means for normally holding said second named cam member to prevent rotation of the latter, and means actuated by a predetermined pressure of the released air for moving said holding means out of holding engagement with said second named cam member.

8. In a pneumatic control for lubricators, a valve casing having an inlet and an outlet, a valve disposed between said inlet and said outlet, a lever having a cam member fixed thereto, said cam member being mounted for rotation, a second cam member in engagement with said first named cam member, said second named cam member being rotatable and slidable with respect to said first named cam member, means connecting said second named cam member with said valve for opening the latter, means for normally holding said second named cam member to prevent rotation of the latter, means actuated by a predetermined pressure of the released air for moving said holding means out of holding engagement with said second named cam member, said last named means comprising an auxiliary cylinder, a spring pressed valve for admitting air from said valve casing into said cylinder, a piston within said auxiliary cylinder, and means engaged by the piston for moving said holding means.

9. In a pneumatic control for lubricators, a valve casing having an inlet and an outlet, a valve disposed between said inlet and said outlet, a lever having a cam member fixed thereto, said cam member being mounted for rotation, a second cam member in engagement with said first named cam member, said second named cam member being rotatable and slidable with respect to said first named cam member, means connecting said second named cam member with said valve for opening the latter, means for normally holding said second named cam member to prevent rotation of the latter, means actuated by a predetermined pressure of the released air for moving said holding means out of holding engagement with said second named cam member, said last named means comprising an auxiliary cylinder, a spring pressed valve for admitting air from said valve casing into said cylinder, a piston within said auxiliary cylinder, means engaged by the piston for moving said holding means, and means for holding said spring pressed valve to its seat, thereby putting said piston out of commission.

10. In a pneumatic control for lubricators, a valve casing having an inlet and an outlet, a valve disposed between said inlet and said outlet, a lever having a cam member fixed thereto, said cam member being mounted for rotation, a second cam member in engagement with said first named cam member and being provided with a non-circular shoulder integral therewith, said second named cam member being slidable and rotatable with respect to said first named cam member, means connecting said second named cam member with said valve for opening the latter when said lever is moved, a second lever having a non-circular opening adapted to normally receive the non-circular portion of said second named cam member, and pneumatic means for automatically moving said second named lever away from the non-circular portion of said second named cam member, whereby the latter is free to rotate.

11. In a pneumatic control for lubricators, a valve casing having an inlet and an outlet, a valve disposed between said inlet and said outlet, a lever having a cam member fixed thereto, said cam member being mounted for rotation, a second cam member in engagement with said first named cam member and being provided with a non-circular shoulder integral therewith, said second named cam member being slidable and rotatable with respect to said first named cam member, means connecting said second named cam member with said valve for opening the latter when said lever is moved, a second lever having a non-circular opening adapted to normally receive the non-circular portion of said second named cam member, and pneumatic means for automatically moving said second named lever away from the non-circular portion of said second named cam member, whereby the latter is free to rotate, said means comprising a cylinder, a spring pressed valve for admitting air from said valve casing into said cylinder, a piston within said auxiliary cylinder, and means engaged by the piston for moving said second named lever.

CHARLES F. HOOFER.